United States Patent [19]

Sammells

[11] 4,341,847
[45] Jul. 27, 1982

[54] ELECTROCHEMICAL ZINC-OXYGEN CELL

[75] Inventor: Anthony F. Sammells, Naperville, Ill.

[73] Assignee: Institute of Gas Technology, Chicago, Ill.

[21] Appl. No.: 196,749

[22] Filed: Oct. 14, 1980

[51] Int. Cl.³ ............................................. H01M 4/00
[52] U.S. Cl. ........................................ 429/27; 429/40; 429/94; 429/178; 429/229
[58] Field of Search ................................ 429/27–29, 429/15, 94, 14, 229, 40, 178

[56] References Cited

U.S. PATENT DOCUMENTS

| | | | |
|---|---|---|---|
| 3,527,617 | 9/1970 | Prober | 429/15 |
| 3,871,920 | 3/1975 | Grebier et al. | 429/27 |
| 3,963,519 | 6/1976 | Louie | 429/29 |
| 4,009,320 | 2/1977 | Gerbier | 429/27 |
| 4,112,198 | 9/1978 | Przybyla | 429/27 |
| 4,136,232 | 1/1979 | Durand | 429/27 X |
| 4,137,371 | 1/1979 | Blanchart et al. | 429/30 X |
| 4,181,776 | 1/1980 | Lindstrom | 429/27 |
| 4,184,008 | 1/1980 | Watakabe | 429/27 |
| 4,214,044 | 7/1980 | Chevet | 429/27 |
| 4,254,190 | 3/1981 | Zaromb | 429/27 X |

Primary Examiner—Charles F. Lefevour
Attorney, Agent, or Firm—Thomas W. Speckman

[57] ABSTRACT

An electrochemical zinc-oxygen cell is disclosed which has annular electrodes wherein oxygen flows through the central portion of a diffusion cathode and a liquid electrolyte flows between a separator surrounding the diffusion cathode and concentric anode spaced from the separator. The disclosed cell may be recharged electrochemically or by replenishment of active zinc particles in the electrolyte exterior to the cell. The electrochemical cell of the present invention provides a zinc-oxygen cell having a zinc anode surface providing more even contact with the active electrolyte and more even surface upon repeated electrochemical recharging than prior cells while permitting higher pressure differentials across the oxygen diffusion cathode structure than prior art cells.

12 Claims, 2 Drawing Figures

ELECTROCHEMICAL ZINC-OXYGEN CELL

BACKGROUND OF THE INVENTION

This invention relates to electrochemical zinc-oxygen cells and more particularly to electrochemical zinc-oxygen cells which have annular electrodes wherein oxygen flows through the central portion of a diffusion cathode and a liquid electrolyte flows between the cathode a and a concentric anode spaced from the cathode. The cell of this invention may be recharged electrochemically or by replenishment of active zinc particles in the electrolyte.

Zinc-oxygen cells have been used in batteries for electric vehicles and the like because they provide high energy density relative to other gas diffusion cells, and therefore high capacity. Zinc-oxygen cells may be recharged by mechanically replacing the zinc electrode, by replacing the liquid electrolyte which contains zinc particles or by electrochemically replenishing zinc to the anode.

Many zinc-oxygen cells have a zinc anode and an oxygen cathode separated by a liquid electrolyte. Other zinc-oxygen cells have anode active zinc particles dispersed in the electrolyte and a non-chemically reactive anode. When an external electrical load is connected to the electrodes, current flows through the circuit of the cell and load due to chemical reactions which take place at the electrode surfaces.

Prior zinc-oxygen cells have not been as stable as desired due in part to the zinc anode surface becoming uneven in operation in both the discharge and the electrochemical charge mode. Further, zincate ions formed in the electrolyte may decrease the electrocatalytic activity of the electrocatalytically active gas-electrolyte-electrode reaction sites. It is important to retain as many as possible electrocatalytically active gas-electrolyte-catalyst reaction sites readily available to each of the three phases of reaction participants.

U.S. Pat. No. 4,009,320 teaches an air-zinc battery having air passages through an active carbon cathode which is surrounded by a gelled electrolyte. U.S. Pat. No. 4,137,371 describes a zinc-oxygen cell having a zinc electrode, and an oxygen porous diffusion cathode with a diffusion of zincate restricting membrane joined directly to the oxygen electrode between the porous layer of this electrode and the zinc electrode. This is stated to prevent poisoning of the electrochemically active material by zincate ions. Flowing electrolytes containing anode active metal, such as zinc, in zinc-oxygen cells, are described in U.S. Pat. No. 4,136,232. Problems of such cells connected in series are pointed out in that patent.

None of the prior art known to the inventor suggests an electrochemical zinc-oxygen cell having concentric electrodes and a flowing electrolyte in the annular space therebetween providing slurry and electrochemical recharging in the same cell, uniform anodic deposition and an anode having greater surface area than the cathode to the electrolyte.

Accordingly, an object of this invention is to provide an electrochemical zinc-oxygen cell overcoming many of the disadvantages of prior zinc-oxygen electrochemical cells.

Another object is to provide a zinc-oxygen electrochemical cell which is of annular construction, having concentric tubular electrodes with oxygen containing gas passing through the central portion of a tubular oxygen diffusion cathode and liquid electrolyte passing through an annular space between the tubular cathode and a tubular metal anode.

Still another object is to provide a zinc-oxygen electrochemical cell having a zinc anode surface which provides more even contact with the active electrolyte and a more even surface upon repeated electrochemical recharge.

Yet another object is to provide a zinc-oxygen electrochemical cell having an anode active zinc particle-electrolyte slurry which circulates in the annular electrolyte space and may be readily replenished exterior to the cell.

Another object is to provide a zinc-oxygen electrochemical cell having a geometry permitting higher pressure differentials across the oxygen diffusion cathode structure reducing poisoning of the catalytically active reaction sites.

SUMMARY OF THE INVENTION

In keeping with one embodiment of the invention, an electrochemical zinc-oxygen cell has a tubular oxygen diffusion cathode which is electrically conducting and oxygen-porous, forming a central tube for passage of oxygen containing gas, a concentric ion conducting separator surrounding and in ionic contact with the oxygen cathode, a concentric electrically conducting anode spaced from and surrounding the separator forming an annular electrolyte space between the separator and the anode for passage of a flowing liquid electrolyte. The anode surface in contact with the electrolyte may be zinc which may be recharged electrochemically with application of a reverse electrical potential in a recharging mode of operation. The anode surface in contact with the electrolyte may be non-chemically reactive with the electrolyte and anode active zinc particles are transported by an electrolyte slurry.

BRIEF DESCRIPTION OF THE DRAWING

The above mentioned and other features of this invention and the manner of obtaining them will become more apparent and the invention itself will be best understood by reference to the following description of preferred embodiments of the invention taken in conjunction with the accompanying drawings wherein.

DESCRIPTION OF THE PREFERRED EMBODIMENTS

Figure 1:
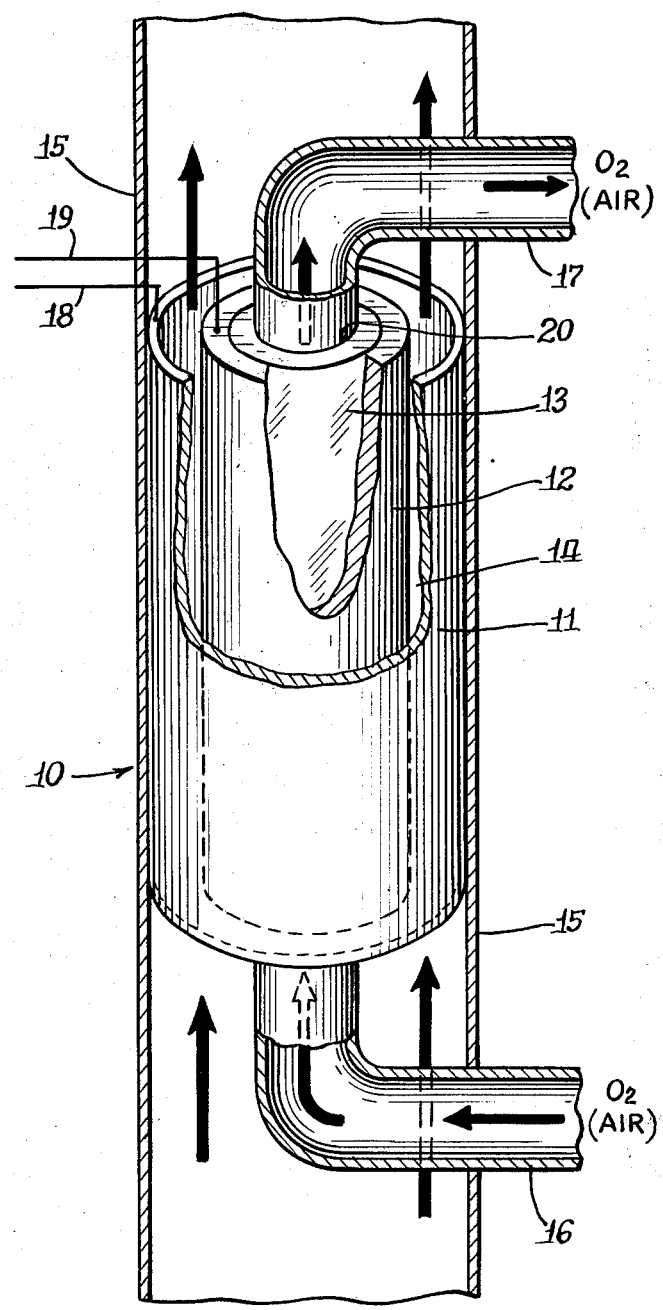
FIG. 1 is a partial cut-away view of an electrochemical zinc-oxygen cell according to one embodiment of this invention.

Referring to the figures, a tubular electrochemical zinc-oxygen cell 10 has tubular oxygen diffusion cathode 13 which is electrically conducting and oxygen-porous forming a central portion 20 for passage of oxygen. Means are provided for passing oxygen containing gas through and in contact with central portion 20. A concentric ion conducting separator 12 surrounds the cathode 13 in ionic contact with it. A concentric electrically conducting anode 11 is spaced from and surrounds the separator 12 forming annular electrolyte space 14 between the separator 12 and the anode 11. Means are provided for passing liquid electrolyte through annular electrolyte space 14 in ionic contact with separator 12 and anode 11.

Tubular housing 15, through which the slurry circulates, surrounds and contains electrochemical cell 10. Oxygen containing gas enters diffusion cathode 13 through intake conduit 16 in sealed relation at one end of central portion 20 of tubular cathode 13 and leaves central portion 20 through outlet conduit 17 in sealed relation at the other end of central portion 20.

External electrical connections are provided by positive terminal 18 which is electrically connected to anode 11, and negative terminal 19 which is electrically connected to cathode 13.

Housing 15, intake conduit 16 and outlet conduit 17, may be made of any suitable non-electrically conducting material which is impervious to and nonreactive with the electrolyte. A wide variety of synthetic polymeric materials such as polyethylene, polypropylene and phenolic resins are suitable.

Suitable oxygen diffusion cathodes are known to the art, such as catalyst-containing teflon bonded air diffusion cathodes. A preferred catalyst for air cathodes, the catalyst site for oxygen reduction in the discharge mode, is high surface area, about 100 m²/gm, platinum supported on carbon or graphite. This catalyst provides a low electrode polarization, on a unit weight basis, about 350 mV at a current density of 40 mA/cm² based upon an exchange current density of $10^{-10}$ A/cm² at 25° C. and a Tafel slope of 60 mV/decade. At low electrochemical charge rates the same catalyst sites may be used for oxygen reduction and evolution. To reduce corrosion at higher charge rates, graphite may be used as the catalyst support. Bifunctional oxygen diffusion cathodes may be used, for example, a plated platinum screen on the electrolyte side to provide a catalytic site for oxygen evolution. The diffusion cathode is gas permeable to allow oxygen to reach the catalytic reaction sites but is liquid impermeable to retain the electrolyte. The tubular shape of the cathode and the concentric ion conducting separator surrounding and in structural contact with it provide a structure which can withstand higher pressure differentials between the gas pressure within the central portion of the tubular gas diffusion cathode and the liquid electrolyte surrounding the separator. Higher pressure differentials permit more complete flushing of reaction products from reaction sites within the cathode.

By the terminology "tubular" as used in this description and appended claims, any polygonal cross section, and any closed curve cross section, such as round or oval, is included. Round cross sections are preferred.

When the terminology "oxygen" is used in this disclosure and claims, it is understood that a wide number of gases containing substantial portions of oxygen, such as air, are satisfactory for use with the oxygen diffusion cathodes in the cells of this invention. The only requirement is that sufficient oxygen be supplied for reduction without associated gases reacting in an adverse manner with the electrodes or electrolyte.

Separator 12 is tubular and in ionic contact with oxygen diffusion cathode 13. Separator 12 may be a mixture of cation-exchanging resin and binder. Suitable ionically conducting separator materials are well known in the art and include nitrocellulose, cellulose acetate, Nafion (a sulfonated perfluoropolyethylene sold by DuPont), and other fluorocarbon ion exchange membranes.

Anode 11 is also tubular and is concentric to and spaced from separator 12 forming an annular electrolyte space between the separator and the anode. The anode is electrically conducting and may be non-chemically reactive with the electrolyte and one embodiment of this invention and chemically reactive with the electrolyte in another embodiment of this invention. Due to the spaced-concentric geometry of the anode with respect to the cathode in the electrochemical cell of this invention, the surface area of the anode is considerably greater than the surface area of the cathode, as desired for both stable and efficient cell operation. Further, anode 11 may be fabricated from relatively thin metal since housing 15 may be relied upon for structural support. In a first embodiment of this invention, the anode surface in contact with the electrolyte is chemically non-reactive with the electrolyte in which case the anode may be fabricated from or plated with platinum or other metal which is chemically non-reactive to the electrolyte. In another embodiment of this invention the anode surface in contact with the electrolyte is zinc, in which case the anode may be fabricated from a sheet of zinc or by plating zinc on a substrate by any of the methods well known to the art.

The electrolyte is passed through the annular electrolyte space 14 in ionic contact with the ion conducting separator 12 and anode 11. The electrolyte may be any suitable alkaline aqueous electrolyte such as about 4 to 12 N-potassium hydroxide or sodium hydroxide. In the embodiment of the invention utilizing chemically non-reactive anode surfaces, a slurry of anode active metal particles in the electrolyte are passed through the electrolyte space. Suitable anode active metal particles include zinc particles having a size in the order of 10–20 microns present in an amount by weight of zinc in the electrolyte, about 20 to 30 percent of the weight of the electrolyte.

In operation, the zinc from the anode surface or from the anode active zinc particle slurry are converted to zincates which are removed from the electrochemical cell in the electrolyte. The electrochemical cells of this invention may be recharged electrochemically by reversing the cell action and plating zinc on the anode surface which, due to the flowing electrolyte and geometry of the cell reduces dendrite formation as compared with prior cells or the cell may be recharged by removal of the zincate particles and their replacement by anode active zinc particles in the slurry.

Figure 2:
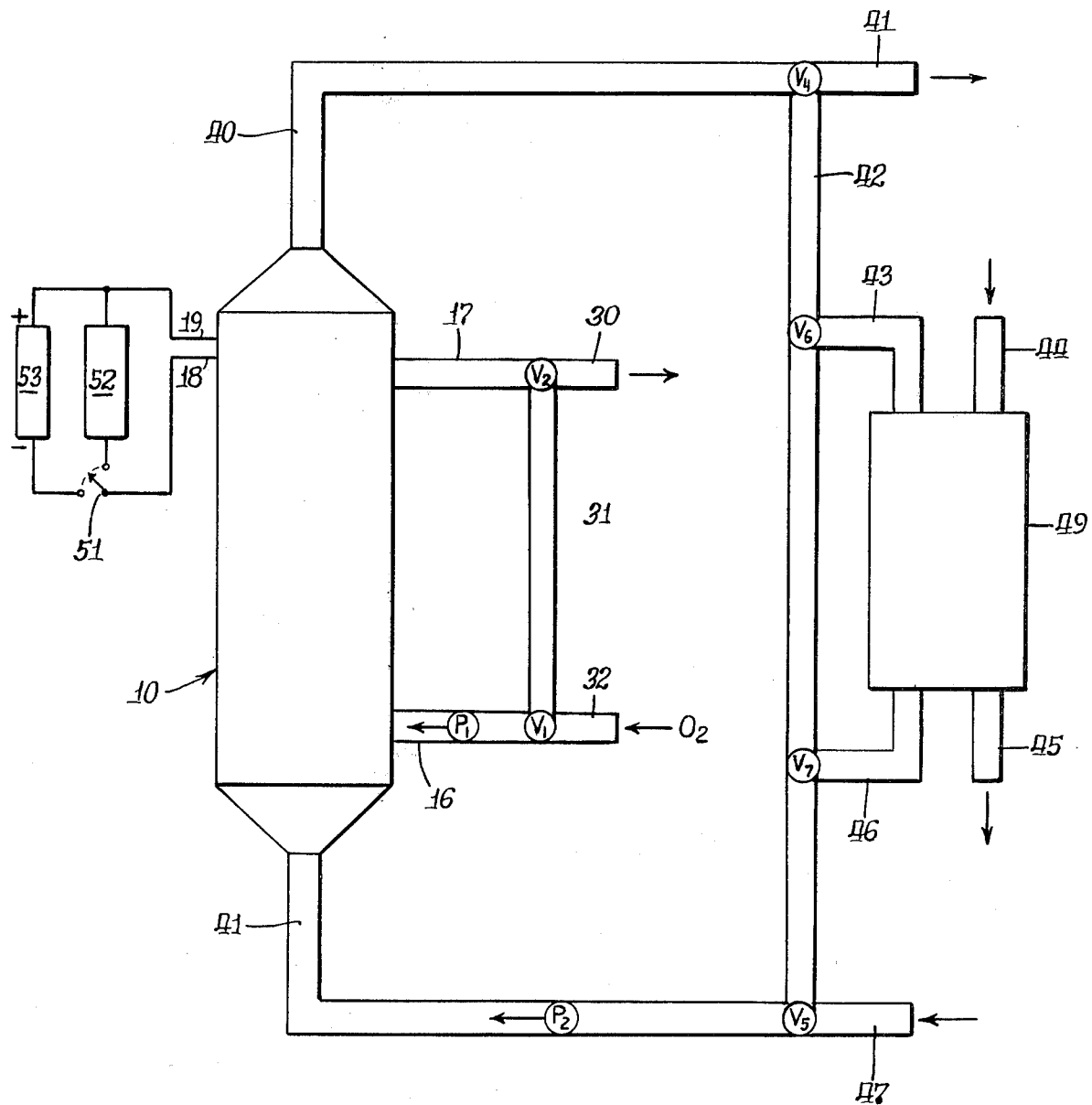
FIG. 2 is a schematic layout showing components for flow of materials through the electrochemical cell and for treatment outside of the cell.

FIG. 2 is schematic layout showing components for flow of materials through the electrochemical cell and for treatment outside of the cell. Electrochemical zinc-oxygen cell 10 is the same cell shown in detail in FIG. 1. Oxygen-containing gas is supplied from any suitable external source to conduit 32 passing through control valve $V_1$ and pump $P_1$ providing desired pressure to the gas in intake conduit 16. The oxygen-containing gas then passes through central portion 20 of tubular oxygen diffusion carthode 13 and out of the cell in outlet conduit 17. Valve $V_2$ provides control for exhausting the gas through conduit 30 to the atmosphere or other treatment or for passing a portion or all of the gas through recycle conduit 31 for recycle to pump $P_1$ and intake conduit 16 where recycled gas may be mixed with fresh oxygen from conduit 32. Conduit 31 may include any type of means for regeneration of oxygen in the gas system.

Liquid electrolyte is provided to annular electrolyte space 14 by intake conduit 41 and may be pressurized as desired by pump $P_2$. The liquid electrolyte passes through the annular electrolyte space and leaves the electrochemical cell by outlet conduit 40 where control valve $V_4$ controls liquid removed from the system by removal conduit 41 and liquid recycled to the electrochemical cell by recycle conduit 42. Suitable flow rates for the electrolyte through the cell are in the order of about 1 to 10 centimeters per second, especially in cells having an annular electrolyte space length of about 12 to 38 centimeters long. All or a portion of the liquid electrolyte passing through recycle conduit 42 may be directed by valve $V_6$ through conduit 43 to regeneration means 49 where it is treated as desired for introduction to electrochemical cell 10 and leaves regeneration means 49 by conduit 46 through valve $V_7$ and passes through control valve $V_5$ to pump $P_2$. Regeneration means 49 may be any suitable means for regeneration of the electrolyte, such as, removal of zincate particles from the electrolyte by removal conduit 45 and introduction of anode active zinc particles to the electrolyte by input conduit 44 or other chemical or physical treatment of the electrolyte to place it is desired condition for the electrochemical zinc-oxygen cell. By this method, the electrochemical cell may be readily recharged by replacement of the zincate particles with anode active zinc particles in the electrolyte slurry. Intake conduit 47 provide for introduction of fresh liquid electrolyte to the system from an external source. As seen from FIG. 2, the fresh electrolyte introduced in conduit 47 may provide make-up electrolyte or entire replacement of electrolyte may be effected.

An external circuit containing either load 52 or power supply 53 for electrochemical charging of the cell is in electrical communication with positive terminal 18 which is electrically connected to anode 11 and negative terminal 19 which is electrically connected to cathode 13. Selection between the load circuit and the charging circuit is provided by switching means 51. Reversal of the cell provides electrochemical charging by methods known to the art.

The configuration of the cell of this invention provides a cell which with the flowing electrolyte and higher pressure differential between the oxygen containing gas and liquid electrolyte provides more effective maintenance of the hydrophobic characteristics of the diffusion region of the oxygen electrode, thereby allowing some improvement in overall electrochemical performance with time.

EXAMPLE

An electrochemical cell according to this invention is constructed as shown in FIG. 1 for operation in the anode active zinc particle slurry mode of operation. The negative electrode, the zinc current collector, is fabricated from a circular nickel tube having a diameter of 2 inches and a length of 9 inches. The positive electrode is a 1½ inch round outside diameter and 9 inches long platinum on carbon (XC-72) Teflon bonded diffusion electrode with a platinum loading of 0.15 milligrams per square centimeter. The hydrophobic backing on the diffusion electrode to prevent loss of the liquid while permitting entry of the gas is Teflon. The diffusion electrode is fully encircled and in contact with a Nafion separator. An electrolyte of 12 molar KOH with 18 grams per liter $SiO_2$ and 180 grams per liter zinc powder, in the fully charged state, is used as electrolyte. The solution is maintained as a metastable colloid by the $SiO_2$. The electrolyte flow rate is 4 centimeters per second.

In operation, the open circuit potential with the electrochemical cell is 1.62 volts. Current densities of 50 milliamps per square centimeter are obtained at a cell voltage of 1.2 volts. Best performance of the oxygen diffusion electrode can be obtained by rapid circulation of oxygen containing gas (air) which increases the kinetics of the oxygen reduction reaction, the exchange current density.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An electrochemical zinc-oxygen cell comprising:
   a tubular catalyst containing oxygen diffusion cathode which is electrically conducting and oxygen porous, said tubular cathode providing a tubular through passage open at each end;
   a concentric tubular ion conducting separator surrounding and in ionic contact with said oxygen cathode;
   a concentric tubular electrically conducting anode spaced radially from and surrounding said separator forming an annular electrolyte space between said separator and said anode, said annular electrolyte space providing an annular through passage open at each end;
   means for pressurizing and passing oxygen containing gas through and in contact with the central portion of said tubular oxygen diffusion cathode, said oxygen containing gas entering at one end and exiting at the other end of said tubular through passage;
   means for passing liquid electrolyte through said annular electrolyte space in ionic contact with said ion conducting separator and said anode, said electrolyte entering at one end and exiting at the other end of said annular through passage and;
   an anode active zinc material in contact with said electrolyte.

2. The electrochemical cell of claim 1 wherein said tubular oxygen diffusion cathode is a round cylinder.

3. The electrochemical cell of claim 2 wherein said tubular anode is a round cylinder.

4. The electrochemical cell of claim 3 wherein said tubular oxygen diffusion cathode and said concentric tubular anode are each electrically connected to an electrically conducting terminal means exterior to the cell.

5. The electrochemical cell of claim 1 wherein said tubular oxygen diffusion cathode and said concentric tubular anode are each electrically connected to an electrically conducting terminal means exterior to the cell.

6. The electrochemical cell of claim 1 wherein said tubular anode surface in contact with said electrolyte is zinc.

7. The electrochemical cell of claim 1 wherein said tubular anode surface in contact with said electrolyte is chemically non-reactive with said electrolyte and said electrolyte comprises anode active zinc particles in an electrolyte slurry.

8. The electrochemical cell of claim 7 additionally having means external to said cell for replenishment of said anode active zinc particles in said electrolyte slurry.

9. The electrochemical cell of claim 1 wherein said means for passing oxygen containing gas through said tubular cathode comprises pumping means maintaining a predetermined gas pressure in said cathode.

10. The electrochemical cell of claim 1 additionally having means external to said cell for replenishment of said electrolyte.

11. The electrochemical cell of claim 1 wherein said oxygen and said electrolyte is passed in a cocurrent manner through said cell.

12. The electrochemical cell of claim 1 additionally having means external to said cell for passing an electrolyte comprising ionic zinc in an electrolyte through said annular electrolyte space and means for applying a reverse electrical potential to said tubular electrodes causing deposition of said zinc to the surface of said anode in a recharging mode of operation.

* * * * *